(12) United States Patent
Huber

(10) Patent No.: US 9,132,907 B2
(45) Date of Patent: Sep. 15, 2015

(54) FLOOR ELEMENT FOR A LOADING DECK OF AN AIRCRAFT

(75) Inventor: Thomas Huber, Schliersee (DE)

(73) Assignee: Telair International GmbH (DE)

( * ) Notice: Subject to any disclaimer, the term of this patent is extended or adjusted under 35 U.S.C. 154(b) by 125 days.

(21) Appl. No.: 13/386,325

(22) PCT Filed: Jul. 21, 2009

(86) PCT No.: PCT/EP2009/005294
§ 371 (c)(1),
(2), (4) Date: Jan. 20, 2012

(87) PCT Pub. No.: WO2011/009474
PCT Pub. Date: Jan. 27, 2011

(65) Prior Publication Data
US 2012/0119027 A1    May 17, 2012

(51) Int. Cl.
*B64D 9/00* (2006.01)
*B64C 1/20* (2006.01)
*B64C 1/18* (2006.01)

(52) U.S. Cl.
CPC ... *B64C 1/20* (2013.01); *B64C 1/18* (2013.01); *B64D 9/00* (2013.01); *B64D 2009/006* (2013.01)

(58) Field of Classification Search
CPC .............. B64C 1/18; B64C 1/20; B64C 1/22; B64C 1/1415; B64D 9/00; B64D 9/003; B64D 2009/006
USPC ................. 244/118.1, 118.2, 137.1; 105/375; 137/899.2; 4/670
See application file for complete search history.

(56) References Cited

U.S. PATENT DOCUMENTS

| 5,927,650 | A * | 7/1999 | Huber .................. 244/118.1 |
| 6,039,288 | A | 3/2000 | Huber et al. |
| 7,073,994 | B2 * | 7/2006 | Huber et al. .................. 410/92 |
| 7,214,015 | B2 * | 5/2007 | Bruns .................. 410/102 |
| 7,344,013 | B2 * | 3/2008 | Krueger .................. 244/118.1 |
| 2007/0095978 | A1 * | 5/2007 | Oetken et al. .............. 244/118.1 |
| 2007/0125908 | A1 | 6/2007 | Eichholz et al. |

FOREIGN PATENT DOCUMENTS

| DE | 19627846 | 1/1998 |
| DE | 19712278 | 9/1998 |
| DE | 10204024 | 9/2003 |
| DE | 102005007308 | 8/2006 |
| FR | 2879998 | 6/2006 |

(Continued)

OTHER PUBLICATIONS

International Search Report for International Application No. PCT/EP2009/005294 dated Apr. 29, 2010.

*Primary Examiner* — Tien Dinh
*Assistant Examiner* — Richard R Green
(74) *Attorney, Agent, or Firm* — Barnes & Thornburg LLP

(57) ABSTRACT

Floor elements for a loading deck of an aircraft may be provided. The floor elements may include a hollow profiled element having a cover plate and a base plate which are connected to each other by webs. In order to collect water and/or to heat the loading deck, the hollow profiled element is designed at least in some sections as a conduit for conducting liquids and/or gases. In this way, the cargo deck thus formed by the floor elements simultaneously has several functions, namely the actual cargo deck function and the function of a liquid collecting trough which can be heated or is used as a heater for the cargo hold.

27 Claims, 1 Drawing Sheet

(56) References Cited

FOREIGN PATENT DOCUMENTS

| JP | 2005206139 | 8/2005 |
| WO | 9925601 | 5/1999 |
| WO | 2011009474 | 1/2011 |

\* cited by examiner

FLOOR ELEMENT FOR A LOADING DECK OF AN AIRCRAFT

CROSS-REFERENCE TO RELATED APPLICATIONS

This application claims priority to, and is a National Phase application of, pending PCT/EP2009/005294 entitled Floor Element For a Loading Deck of an Aircraft, filed Jul. 21, 2009, the disclosure of which is hereby incorporated by reference in its entirety.

FIELD OF THE INVENTION

Some embodiments of the invention relate to a floor element for a loading deck of an aircraft.

BACKGROUND OF THE INVENTION

The loading deck of an aircraft performs several functions. On one hand, the loading deck has functional units via which the cargo hold can be loaded and unloaded and via which the load can be secured to the loading deck during the flight. In addition, conversion of such loading decks should be quick and easy since conversion from loading deck to passenger deck may also be desired.

DE 197 12 278 B4 discloses a floor element of the type referred to at the outset, comprising a hollow profiled element with a cover plate and a base plate which are connected to each other by webs. Ball elements are disposed in this base plate as functional elements. Moreover, troughs are provided for mounting other types of functional elements, e.g. roller drive units, in the floor element. The known floor element, however, is only used as a "special construction form" in the inward loading region of a loading deck, that is to say where the load may have to be rotated if necessary after being introduced into the cargo hold.

Furthermore, DE 19627846 C2 discloses a functional element for the installation of a loading deck comprising a turning member which enables fast conversion of the loading deck.

The construction of a loading deck for an aircraft using the known elements is relatively time-consuming. In particular, special precautions must always be taken to drain away any liquids penetrating the cargo hold and to treat them in such a way that no disruption occurs during loading and unloading.

SUMMARY OF THE INVENTION

Some embodiments in accordance with the invention provide a floor element for a loading deck of an aircraft to the effect that simplification of the overall construction is assured with improved operational characteristics.

The floor element may be constructed as a hollow profiled element fulfils a second function, namely that it is designed as a conduit for conducting liquids and/or gases (fluids). As a result of this it is possible to drain away any liquids penetrating. Additionally, because the floor element is designed for conducting gases and is therefore sealed tight, it is ensured that the sections above the loading deck and below the loading deck are separated from each other so as to be gas-tight at least in the areas in which the floor element is mounted. Naturally, it is assumed here that the floor elements substantially constitute the entire loading deck whereby the floor elements are advantageously constructed to be so large that they span the cargo hold in its lateral dimension thus minimising sealing work between the various floor elements.

Preferably, the base plate together with edge-side webs forms a liquid-tight trough. Therefore, in this case it not the fact of what the cover plate looks like, it is rather exclusively the fact that all liquids arising are caught by the trough. In fact, not only the installation openings for the usual functional elements form apertures for any water arising but rather additional drainage holes are preferably also provided which connect the cargo hold with the interior of the hollow profiled element, that is to say with the "conduit". It should also be mentioned at this point that hollow profiled elements are not only to be understood as mainly integrally manufactured configurations (as according to DE 197 12 278 B4), but rather "hollow profiled elements" constructed of multiple parts are also conceivable. It is merely important that at least the base plate (together with "side walls" terminating on the edge-side) forms the necessary trough for catching the liquids.

Connectors for draining liquids are preferably provided on the base plate. This liquid can then be drained into separate tanks or can possibly be discharged directly to the outside.

To ensure that the liquid drainage system does not freeze even at very low temperatures, heating devices are preferably provided for heating the floor element and in particular for heating the base plate on which the liquid lies or flows.

The hollow profiled element or the conduits contained therein are preferably connected to a heating system of the aircraft in such a manner that the hollow profiled element is heatable. Thus it is possible, for example, to introduce what is referred to as bleed air from the jet engines essentially over the full cross-section of the section. This ensures heating of the base plates which not only acts as protection against freezing but can also be useful for other reasons, e.g. if a correspondingly cold-sensitive load is transported.

Additionally (or also alternatively), the heating devices comprise electric heating elements, in particular at those points which are particularly susceptible to freezing. Mention should be made here, for example, of the connectors for draining the liquid.

The floor element preferably comprises integrally incorporated retaining sections, in particular seat rail sections in the cover plate, which can not only be used to convert a deck constructed in this way to a passenger deck but which can also be used in a manner known per se for attaching the most varied functional units.

It is also advantageous if the floor element comprises functional elements, in particular turning members such as are disclosed in DE 196 27 846 C2. As a result, it is possible to reconfigure the cargo deck and adapt it to the load to be transported with particular speed.

A particularly advantageous use of the floor element described is that of liquid-tight and/or gas-tight separation of an aircraft cargo hold from a bilge space situated below it. As a result it is possible to ensure without additional sealing elements (except in the region between the outer skin and the floor elements) that the bilge space separated from the cargo hold can be filled with an extinguishing gas in the event of fires. In addition, use of the described floor element for catching liquids, particularly for catching water, is especially advantageous.

BRIEF DESCRIPTION OF THE DRAWINGS

Preferred embodiments of the invention will be described subsequently in greater detail on the basis of drawings. The drawings show.

DETAILED DESCRIPTION

Figure 1:
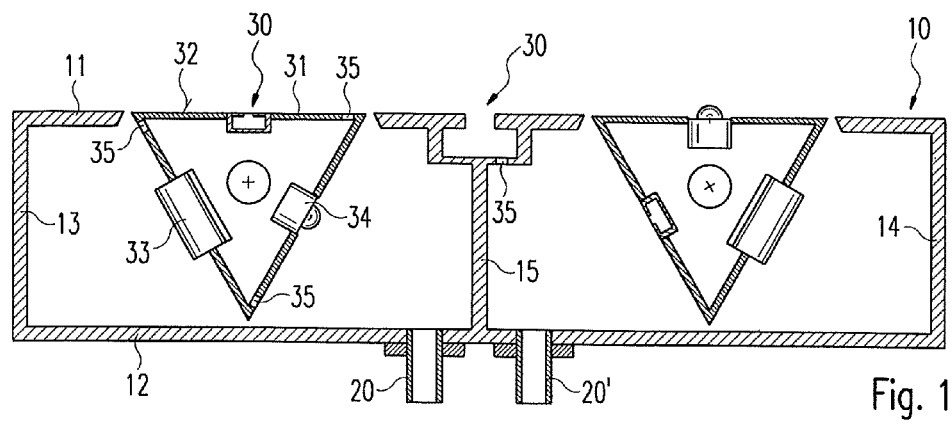
FIG. 1 shows a cross-section through a first embodiment of the invention.

In the following description, the same reference numerals are used for identical parts and parts acting in an identical manner. In addition, it is expressly pointed out that the proportions illustrated vary significantly from the actual proportions existing whereby these variations are used for better presentability in the drawings.

FIG. 1 shows an integrally extruded hollow profiled element 10, preferably of aluminum, comprising a cover plate 11 and a base plate 12. Cover plate 11 and base plate 12 are connected to each other via edge-side webs 13, 14 and a central web 15. A retaining section 30 in the form of a seat rail is cast in the region of central web 15. The interior of retaining section 30 has a drainage hole 35 so that liquid which has accumulated in this region can be drained away into the trough formed out of base plate 12 and edge-side webs 13, 14.

In addition, turning members 31 are installed in cover plate 11, which depending on the orientation form a functional surface 32 (this may be smooth or may also have a retaining section 30), a surface with incorporated roller units 33 or a surface with incorporated ball units 34 as a partial section of cover plate 11. Such turning members 31 are illustrated in greater detail in DE 196 27 846 C2. These turning members 31 likewise have drainage holes 35 so that no water can accumulate in turning members 31 either.

Mounted on base plate 12 are connectors 20, 20' via which the interior of hollow profiled element 10 can be joined to drain pipes in order to discharge any water that has penetrated.

Figure 2:
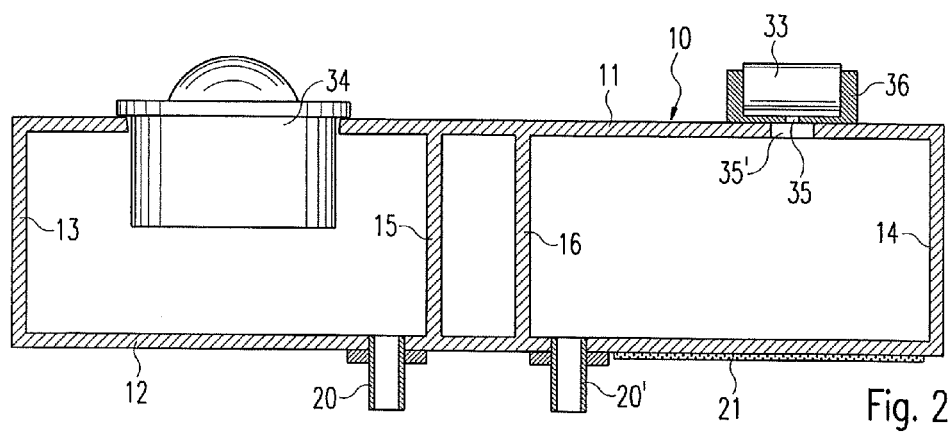
FIG. 2 shows a second embodiment of the invention in cross-section.

The embodiment of the invention illustrated in FIG. 2 differs from that according to FIG. 1 in that the functional elements, namely a ball unit 34 or a roller unit mounted in a mounting rail 36, are mounted on or in cover plate 11. The interior of mounting rail 36 which can of course also be used to accommodate roller drive units or locking elements, is drained via a drainage hole 35 in mounting rail 36 and a corresponding drainage hole 35' in cover plate 11.

Instead of single web 15 (as in FIG. 1), in the embodiment according to FIG. 2, two webs 15, 16 joining cover plate 11 and base plate 12 are provided. The space between webs 15, 16, base plate 12 and cover plate 11 is thus hermetically sealed and can also be used to conduct gases or liquids which are at a different pressure to the remaining surroundings.

In addition, in the embodiment according to FIG. 2, an electric heating element 21 is shown in diagram form which is attached in such a way that base plate 12 is heated and in particular in the region of connector 20'. This ensures that even water introduced at low temperatures does not freeze and therefore does not block the pipe or the drain. Additionally or alternatively, in one embodiment (not shown in the drawings) it is envisaged to link the interior of the hollow profiled element with a heating system of the aircraft which may in particular include bleed air from the jet engines. The duct described above and defined by webs 15, 16 is excellently suited to this whereby a corresponding material thickness of base plate 12 is to be aimed at such that adequate heat conduction is ensured.

Figure 3:
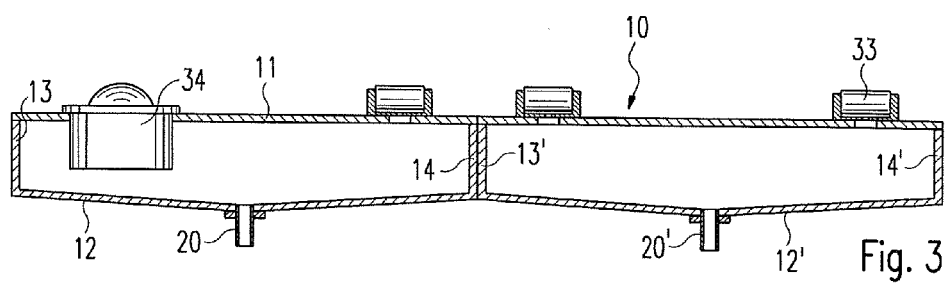
FIG. 3 shows a third embodiment of the invention.

The embodiment of the invention illustrated in FIG. 3 differs from that according to FIG. 2 in that hollow profiled element 10 of multi-part design. In this case, only a single cover plate 11 is provided, on the underside of which two base plates 12, 12' are mounted with their respective, edge-side sections 13, 14 and 13', 14'. This is only intended as an example that a multi-part design is easily possible. Thus cover plate 11 may also be of multi-part design. It is important here that the entire hollow profiled element essentially forms a single continuous "trough" across its whole width.

In addition, base plates 12, 12' are formed sloping towards the centre in such a way that water flowing in collects in the centre of base plates 12, 12' and can be drained away into an appropriate piping system via connectors 20, 20' provided there.

Figure 4:
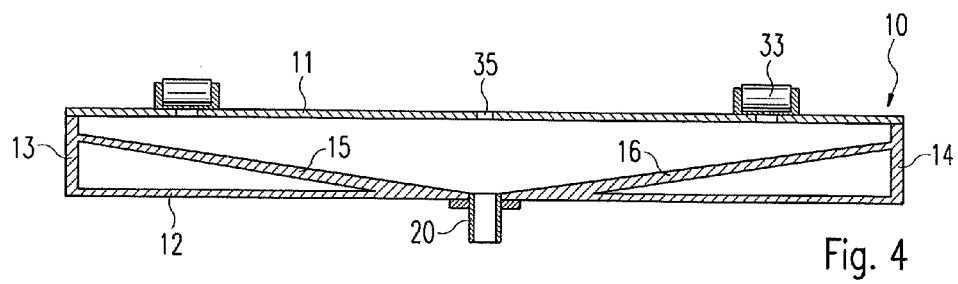
FIG. 4 shows a fourth embodiment of the invention.

In the embodiment illustrated in FIG. 4, a single base plate 12 with edge-side webs 13, 14 again forms a trough which is connected to a cover plate 11. Cover plate 11 is again connected (as already described above) to the interior of the hollow profiled element via a drainage hole 35.

In this embodiment of the invention, inner webs 15, 16 are formed sloping in such a way that they ensure drainage of the water that has penetrated into the centre and thus towards connector 20. With this embodiment too, gas-tight cavities are again formed between base plate 12, edge-side webs 13, 14 and inner webs 15, 16 which are suitable for conducting liquids or gases under pressure.

It should also be mentioned again at this point that the floor elements illustrated are particularly well suited to the construction of entire aircraft decks. Seals would then have to be provided between individual floor elements in such a way that the entire surface of the cargo deck would form, as far as possible, a gas-tight and liquid-tight area or trough whereby complete throughflow can be ensured for the most even heating possible when heating by means of bleed air.

REFERENCE NUMBERS

10 Hollow profiled element
11 Cover plate
12 Base plate
13 Edge-side web
14 Edge-side web
15 Inner web
16 Inner web
20, 20' Connector
21 Electrical heating element
30 Retaining section
31 Turning member
32 Functional surface
33 Roller unit
34 Ball unit
35, 35' Drainage hole
36 Mounting rail

The invention claimed is:

1. A floor element for a loading deck of an aircraft, comprising:

an integrally extruded hollow profiled element having a cover plate and a base plate which are integrally connected to each other by a first web, a second web and a third web, wherein the hollow profiled element is designed at least in sections as a conduit for conducting a fluid wherein the base plate, the first web and the second web of the hollow profiled element form a first liquid-tight trough adapted to conduct a liquid, and the base plate, the second web and the third web of the hollow profiled element form a second liquid-tight trough adapted to conduct a liquid, the cover plate including a first drainage hole in fluid communication with the first liquid-tight trough adapted to drain liquid into the first liquid-tight trough, the cover plate including a second drainage hole in fluid communication with the second liquid-tight trough adapted to drain liquid into the second liquid-tight trough, the hollow profiled element including a seat rail section in the cover plate, the second web extending between the base plate and the seat rail section;
a first connector attached to the base plate of the hollow profiled element in fluid communication with the first liquid-tight trough adapted to drain liquid from the first liquid-tight trough; and
a second connector attached to the base plate of the hollow profiled element in fluid communication with the second liquid-tight trough adapted to drain liquid from the second liquid-tight trough.

2. The floor element of claim 1, including one or more heating devices configured to heat the floor element.

3. The floor element of claim 2, wherein the hollow profiled element is joined to a heating system of the aircraft in such a manner that the hollow profiled element is heatable.

4. The floor element of claim 2, wherein the heating devices comprise electric heating elements.

5. The floor element of claim 2, wherein the heating devices are configured to heat the base plate.

6. The floor element of claim 1, wherein each seat rail section includes a drainage hole in fluid communication with the second liquid-tight trough.

7. The floor element of claim 1, wherein the floor element further comprises a turning member disposed in the hollow profiled element, the turning member including a plurality of surfaces, each surface of the turning member adapted to be selectively positioned generally coplanar with the cover plate.

8. The floor element of claim 7, wherein at least one surface of the turning member includes an element selected from the group consisting of a seat rail, a roller unit and a ball unit.

9. A method of using a floor element according to claim 1 for fluid tight separation of a space in the cargo hold of the aircraft above the loading deck from a space below the loading deck.

10. The method of claim 9, whereby liquid introduced into the cargo hold is caught, collected and drained away in the hollow profiled element.

11. The method claim 10, wherein the liquid comprises water.

12. The method of claim 9, wherein the space below the loading deck comprises a bilge space.

13. The floor element of claim 1, wherein the seat rail section of the hollow profiled element is integrally incorporated with the cover plate.

14. A floor element for a loading deck of a cargo hold of an aircraft, the floor element comprising:
a base plate;
a cover plate; and
a first web, a second web, a third web and a fourth web extending between and integrally connected to the base plate and the cover plate, the first web and the second web forming a first liquid-tight trough in the floor element adapted to conduct a liquid, the third web and the fourth web forming a second fluid-tight trough in the floor element adapted to conduct a liquid, and the second web and the third web forming a fluid-tight fluid channel in the floor element adapted to conduct a fluid, the floor element adapted to span the entire cargo hold of the aircraft in a lateral direction, whereby the base plate is adapted to span the entire cargo hold of the aircraft in a lateral direction.

15. The floor element of claim 14 wherein said webs are generally parallel to one another.

16. The floor element of claim 14 including a connector attached to the base plate in fluid communication with the second liquid-tight trough, the connector adapted to drain liquid from the second liquid-tight trough.

17. The floor element of claim 16 including an electric heating element coupled to the base plate adjacent the connector.

18. The floor element of claim 14 wherein the fluid channel is coupled in fluid communication with an engine of the aircraft such that bleed air from the engine of the aircraft is adapted to flow through the fluid channel to heat the floor element.

19. The floor element of claim 14 including a seat rail formed in the cover plate.

20. The floor element of claim 19 wherein the seat rail includes a drainage hole in fluid communication with the second liquid-tight trough.

21. The floor element of claim 14 wherein the cover plate includes a drainage hole in fluid communication with the second liquid-tight trough.

22. The floor element of claim 14, wherein the floor element is adapted to provide a fluid-tight separation between a space in the aircraft above the loading deck and a space in the aircraft below the loading deck.

23. A floor element for a liquid-tight loading deck of a cargo hold of an aircraft, the floor element comprising:
a base plate;
a cover plate including a drainage hole;
a first inner web located between the base plate and the cover plate; and
a second inner web located between the base plate and the cover plate, the base plate, first inner web and second inner web being integrally connected with one another, the first inner web and the second inner web forming a liquid-tight trough, the drainage hole of the cover plate being in fluid communication with the liquid tight-trough;
the floor element adapted to span the entire cargo hold of the aircraft in a lateral direction, whereby the base plate is adapted to span the entire cargo hold of the aircraft in a lateral direction.

24. The floor element of claim 23 including a first side web and a second side web that extend between the base plate and the cover plate, the first inner web extending between and connected to the base plate and the first side web, and the second inner web extending between and connected to the base plate and the second side web.

25. The floor element of claim 23 wherein the first inner web and the base plate form a first fluid-tight fluid channel adapted to conduct a fluid, and the second inner web and the base plate form a second fluid-tight fluid channel adapted to conduct a fluid.

26. The floor element of claim 23 including a connector attached to the base plate in fluid communication with the liquid-tight trough, the connector adapted to drain liquid from the liquid-tight trough.

27. A liquid-tight loading deck for a cargo hold of an aircraft, the loading deck comprising:
a plurality of floor elements extending in the longitudinal direction of the cargo hold, each floor element comprising a base plate, a cover plate including a drainage hole, a first inner web located between the base plate and the cover plate, and a second inner web located between the base plate and the cover plate, the base plate, first inner web and second inner web being integrally connected with one another, the first inner web and second inner web forming a liquid-tight trough, the drainage hole of the cover plate being in fluid communication with the liquid-tight trough, the first inner web and the base plate forming a fluid-tight channel adapted to conduct a fluid each floor element adapted to span the entire cargo hold of the aircraft in a lateral direction, whereby the base plate is adapted to span the entire cargo hold of the aircraft in a lateral direction;

whereby the plurality of floor elements are located adjacent one another along the longitudinal direction of the cargo hold and in sealing engagement with one another such that the liquid-tight troughs of the floor elements are sealed in liquid-tight communication with one another.

\* \* \* \* \*